United States Patent [19]

Habermehl

[11] Patent Number: 4,539,761
[45] Date of Patent: Sep. 10, 1985

[54] METHOD OF USING SPENT CRACKING CATALYST AS A WASTE MATERIAL ABSORBANT

[75] Inventor: Robert Habermehl, Shelbyville, Ky.

[73] Assignee: Mobile Companies Inc., Shelbyville, Ky.

[21] Appl. No.: 590,528

[22] Filed: Mar. 16, 1984

[51] Int. Cl.³ .............................................. F26B 3/00
[52] U.S. Cl. ......................................... 34/9; 210/925
[58] Field of Search ............... 34/9; 502/263; 210/925

[56] References Cited

U.S. PATENT DOCUMENTS

| | | | |
|---|---|---|---|
| 3,161,488 | 1/1961 | Eastwood et al. | 55/30 |
| 3,960,760 | 6/1976 | Sanga et al. | 502/411 |
| 4,033,899 | 7/1977 | Bennett et al. | 502/22 |
| 4,131,543 | 12/1978 | Carosello | 210/679 |
| 4,206,080 | 6/1980 | Sato et al. | 210/925 |
| 4,238,243 | 12/1980 | Tu et al. | 502/64 |

*Primary Examiner*—John J. Camby
*Attorney, Agent, or Firm*—Cushman, Darby & Cushman

[57] ABSTRACT

A method of using spent silica-alumina catalyst previously used in a fluid-bed type catalytic cracking process by contacting a volume of particles of the spent catalyst with a liquid and allowing the spent catalyst particles to absorb at least a portion of the liquid. The method is particularly useful in the removal of hazardous liquid spills.

5 Claims, No Drawings

METHOD OF USING SPENT CRACKING CATALYST AS A WASTE MATERIAL ABSORBANT

BACKGROUND AND SUMMARY OF THE INVENTION

The present invention generally relates to a method of utilizing spent silica-alumina catalyst (or F.C.C. catalyst) as an absorbent for waste liquid material. More particularly, the present invention relates to a method whereby spent silica-alumina catalyst is utilized so as to absorb waste material which can either be liquids or a mixture of liquids and solids so that when the spent catalyst is brought into contact with such waste material, a non-flowable, substantially solid mass having the waste material absorbed therein will result. The method of the present invention finds particular utility in the removal of hazardous liquid spills.

The spent silica-alumina catalyst which is suitable for use in the practice of the novel method of the present invention is typically that catalyst which is discarded as waste after it has served as a catalyst for the fluid-bed cracking of petroleum. Such silica-alumina catalyst are believed to be in and of themselves well known to those in this art and, thus, detailed description thereof need not be supplied herein. Conventionally, users of spent silica-alumina catalyst have a problem of disposing of such spent catalyst after it has served its intended functions as a catalyst for the fluid-bed cracking of petroleum.

There have been proposals in the past, however to utilize such spent silica-alumina catalyst for use as a sewer waste water treating agent as exemplied by U.S. Pat. No. 3,960,760 to Sanga et al, the entire disclosure which is expressly incorporated herein to by reference. In accordance with Sanga et al, prior to its use as a waste water treating agent, the silica-alumina catalyst must first be contacted with an aqueous solution of sodium hydroxide at a temperature range of between 70° C. to 105° C. to thereby produce a powder useful for removing ammonium ions and heavy metal ions from waste water. According to Sanga et al therefore, it is only after such treatment that waste or spent silica-alumina cracking catalyst will be useful to treat sewer waste water.

The process of the present invention seeks just the opposite effect in that it has surprisingly been found that raw or untreated spent silica-alumina cracking catalyst can be contacted with waste material so as to form a non-flowable, substantially solid mass. Oftentimes, use of the spent silica-alumina catalyst will result in a lower relative volume of the spent catalyst being required to absorb a unit volume of waste material when compared to popular absorbent material now conventionally utilized.

Reduced resulting volume of absorbants is significant when consideration is given to the cost factors involved in disposing of environmental waste such as hazardous chemicals, petroleum products, oil or the like in a regulated landfill. Typically, landfill operators charge their customers by a unit volume (typically a cubic yard) of matter that is to be deposited in a landfill. Thus, in accordance with the present invention, there is provided a method whereby less resulting volume of absorbent is needed to absorb a unit volume of waste material. This will necessarily translate into less overall disposal costs since more waste material can be deposited in a landfill per unit cost.

Furthermore, since the spent silica-alumina catalyst is typically a waste material from the viewpoint of the petroleum cracking operators, the spent catalyst can be obtained for relatively minimal cost when compared to costs of other conventional absorbents.

These and other advantages of the present invention will become more clear to the reader after detailed consideration is given to the description of the preferred exemplary embodiments thereof which follow.

DETAILED DESCRIPTION OF THE PREFERRED EXEMPLARY EMBODIMENTS

In accordance with the present invention, a method is provided whereby particles of spent silica-alumina catalyst are contacted with a liquid waste material. The catalyst particles are allowed to be in contact with the waste material for a time sufficient to absorb the waste material to form a non-flowable mass.

By the term "waste material" is meant any material having a principal constituent of liquid and thus includes liquids and mixtures of liquids and solids which are typically intended for disposal in solid waste landfills. Thus, by the term "waste material" is meant to refer to both hazardous and non-hazardous waste materials although the present invention is particularly preferable for use in absorbing hazardous liquids and their subsequent transport and discharge into a solid waste landfill.

By the term "non-flowable" is meant to refer to that characteristic of the resulting saturated catalyst material wherein the saturated catalyst material will not flow from a container which is tilted at an angle of about 45° relative to horizontal. Furthermore, the term "non-flowable" is meant to include that characteristic of the resulting saturated catalyst material which prevents an object which exerts a pressure level of between about 4 to about 5 pounds per square inch (psi) on the surface of a volume of the absorbed catalyst from sinking into the volume of saturated catalyst. Under the above criteria, non-flowability of the resultant absorbed spent catalyst is estimated to be in excess of $10^6$ centipoise.

The spent silica-alumina catalyst of the present invention is not required to be admixed with the waste material it is absorbing in order to produce its beneficial absorbing functions thereof, it only being necessary to intimately contact the spent silica-alumina catalyst with the waste material. Thus, in accordance with the present invention, waste silica-alumina catalyst particles previously used in a fluid-bed type catalytic cracking process are contacted with a waste liquid for a time sufficient for the catalyst particles to absorb the liquid.

Further insight into the present invention will be gained by the reader from the following nonlimiting examples thereof.

EXAMPLE I

To examine the efficacy of using waste silica-alumina catalyst particles previously used in a fluid-bed type catalytic cracking process (hereinafter "spent catalyst"), the absorbancy on volume and weight bases for the spent catalyst for various liquid media was compared to the absorbancy on volume and weight bases for a conventional absorbent. The conventional clay-based absorbent utilized was obtained from the Oil Dry Company of Chicago, Ill., under the tradename "Oil-Dry". The results of the volume and weight bases analysis is tabulated below in Tables IA and IB, respectively. A resulting density comparison of solidified material between the Oil-Dry and spent catalyst is tabulated below in Table IC for two selected liquid media.

EXAMPLE II

The absorbancy of the spent catalyst was also compared to "Slickwick" (ground corncob) absorbant commercially obtained from the Andersons of Maumee, Ohio and a clay-based absorbant "Saf-N-Dri" also commercially obtained from the Oil Dry Company. The results to achieve a solidified, nonflowable mass are tabulated below in Table II.

the spent catalyst was considerably more uniform in absorptivity than the "Oil-Dry" absorbant. Thus, the "Oil-Dry" volume required to render the media non-flowable varied from 1.91 to 50% NaOH to 3.87 for trichloroethene whereas the variation for the spect catalyst was 1.87 for 50% NaOH to 2.10 for 10W30 oil. Such uniformity in absorptivity is probably attributable to the more uniform pore sizes of the spent catalyst when compared to the pore sizes of naturally occuring clays utilized in the conventional "Oil-Dry" product.

While the present invention has been herein described in what is presently conceived to be the most preferred embodiments thereof, those in this art may

TABLE IA

| | OIL-DRY | | | SPENT CATALYST | | |
| --- | --- | --- | --- | --- | --- | --- |
| Medium | Volume of Medium (Vm) | Volume of Absorbant (Va) | Resulting Volume (Vr) | Volume of Medium (Vm) | Volume Absorbant (Va) | Resulting Volume (Vr) |
| 1. Water | 1 | 2.41 | 2.03 | 1 | 2.02 | 1.87 |
| 2. 50% HCl | 1 | 2.45 | 2.00 | 1 | 2.02 | 1.87 |
| 3. 50% NaOH | 1 | 1.91 | 1.61 | 1 | 1.87 | 1.73 |
| 4. Trichloroethane | 1 | 3.87 | 3.20 | 1 | 1.95 | 1.80 |
| 5. 10W30 Oil | 1 | 2.65 | 2.20 | 1 | 2.10 | 1.93 |
| Average (All media) | 1 | 2.66 | 2.21 | 1 | 1.99 | 1.84 |

TABLE IB

| | OIL-DRY | | | SPENT CATALYST | | |
| --- | --- | --- | --- | --- | --- | --- |
| Medium | Weight of Medium (Wm) | Weight of Absorbant (Wa) | Resulting Weight (Wr) | Weight of Medium (Wm) | Weight Absorbant (Wa) | Resulting Weight (Wr) |
| 1. Water | 1 | 1.25 | 2.25 | 1 | 1.59 | 2.59 |
| 2. 50% HCl | 1 | 1.13 | 2.13 | 1 | 1.47 | 2.47 |
| 3. 50% NaOH | 1 | 0.71 | 1.71 | 1 | 0.97 | 1.97 |
| 4. Trichloroethane | 1 | 1.50 | 2.50 | 1 | 1.44 | 2.44 |
| 5. 10W30 Oil | 1 | 1.59 | 2.59 | 1 | 1.78 | 2.78 |
| Average (All Media) | 1 | 1.24 | 2.24 | 1 | 1.45 | 2.45 |

TABLE IC

| DENSITIES OF SOLIDIFIED MATERIAL (LBS/FT$^3$) | | |
| --- | --- | --- |
| Medium | Oil-Dry | Spent Catalyst |
| water | 1.11 | 1.39 |
| 50% HCl | 1.20 | 1.49 |

TABLE II

| | | SLICKWICK | | SAF-N-DRI | | SPENT CATALYST | |
| --- | --- | --- | --- | --- | --- | --- | --- |
| Medium | Volume of Medium | Volume of Absorbant | Resulting Volume | Volume of Absorbant | Resulting Volume | Volume of Absorbant | Resulting Volume |
| 1. Water | 1 | 1.55 | 1.93 | 1.55 | 1.87 | 1.90 | 1.87 |
| 2. 10W30 Oil | 1 | 2.60 | 3.18 | 1.36 | 1.54 | 1.70 | 1.90 |

The examples above therefore indicate that the relative volume of the spent catalyst according to the present invention which is required to render the liquid media non-flowable are substantially less than the commercially available "Oil-Dry" and "Slickwick" absorbents. Also, the above examples indicate that the relative volume of the spent catalyst required to render water and 10W30 weight oil non-flowable was substantially equivalent to the "Safe-N-Dry" absorbent. The resulting volumes produced with the spent catalyst in accordance with the present invention were also substantially less than the resulting volumes of the "Oil-Dry" and "Slickwick" absorbents and was competitive with the "Safe-N-Dry" absorbent.

One aspect that the above examples further bring out with respect to the comparison between the spent catalyst of the present invention and the "Oil-Dry" is that recognize that many modifications may be made hereof which modifications shall be accorded the broadest interpretation of the appended claims so as to encompass all equivalent methods and/or processes.

What is claimed is:

1. A method of collecting a volume of liquid comprising the step of (a) bringing a predetermined volume of particles of untreated spent silica-alumina catalyst previously used in a fluid-bed type catalytic cracking process into intimate contact with a liquid and (b) allowing the particles to remain in contact with the liquid for a time sufficient for the particles to absorb a portion of the liquid; and (c) collecting said particles having said portion of said liquid absorbed therein, said predetermined volume of collected particles forming a nonflowable substantially solid mass.

2. A method as in claim 1 further comprising the steps of (c) collecting the particles having the liquid absorbed therein in a container and (d) disposing of the container.

3. A method as in claim 2 wherein step (c) is practiced so that particles in the container support an object placed on the surface of the container, which object exhibits a pressure on the surface of less than or equal to about 4 to about 5 pounds per square inch.

4. A method of removing hazardous liquid spills comprising the steps of:
(a) contacting the hazardous liquid spill with a predetermined volume of particles of untreated spent silica-alumina catalyst previously used in a fluid-bed type catalytic cracking process;
(b) allowing the particles to remain in contact with the hazardous liquid spill for a time sufficient to permit the particles to absorb at least a portion of the hazardous liquid; and
(c) collecting the particles having hazardous liquid absorbed therein, said predetermined volume of collected particles forming a nonflowable substantially solid mass.

5. A method as in claim 4 wherein steps (a)-(c) are repeated with additional volumes of spent catalyst until the hazardous liquid spill has been substantially completely absorbed.

* * * * *